United States Patent
Steingroever

(10) Patent No.: US 9,356,635 B2
(45) Date of Patent: May 31, 2016

(54) METHOD FOR OPERATING A VEHICLE-SIDE RECEIVER DEVICE OF A TRAIN CONTROL SYSTEM AND VEHICLE-SIDE RECEIVER DEVICE

(75) Inventor: Andreas Steingroever, Braunschweig (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 33 days.

(21) Appl. No.: 14/346,013

(22) PCT Filed: Sep. 5, 2012

(86) PCT No.: PCT/EP2012/067306
§ 371 (c)(1),
(2), (4) Date: Mar. 20, 2014

(87) PCT Pub. No.: WO2013/041376
PCT Pub. Date: Mar. 28, 2013

(65) Prior Publication Data
US 2014/0226763 A1    Aug. 14, 2014

(30) Foreign Application Priority Data
Sep. 21, 2011  (DE) .......................... 10 2011 083 122

(51) Int. Cl.
*B61L 17/00*  (2006.01)
*H04B 1/16*  (2006.01)
*B61L 3/24*  (2006.01)
*B61L 27/00*  (2006.01)
*H04L 27/00*  (2006.01)
*H04L 27/02*  (2006.01)

(52) U.S. Cl.
CPC ... *H04B 1/16* (2013.01); *B61L 3/24* (2013.01); *B61L 27/0072* (2013.01); *H04L 27/0012* (2013.01); *H04L 27/02* (2013.01)

(58) Field of Classification Search
CPC ......... B61L 23/00; B61L 23/08; B61L 23/12; B61L 23/14; B61L 23/16; B61L 23/161; B61L 23/22; B61L 23/24
USPC .................... 246/20, 21, 23, 24, 28 R, 30, 33
See application file for complete search history.

(56) References Cited

U.S. PATENT DOCUMENTS 3,743,935 A * 7/1973 Alt ............................... 455/523
5,452,870 A   9/1995 Heggestad
7,006,012 B2  2/2006 Taoka et al.

FOREIGN PATENT DOCUMENTS

| CN | 2424079 Y | 3/2001 |
|----|-----------|--------|
| CN | 1576131 A | 2/2005 |
| CN | 101391616 A | 3/2009 |

(Continued)

*Primary Examiner* — R. J. McCarry, Jr.
(74) *Attorney, Agent, or Firm* — Laurence Greenberg; Werner Stemer; Ralph Locher

(57) ABSTRACT

A particularly powerful method is used for operating a vehicle-side receiver device of a train control system. In this context, the method proceeds in a way that at least one signal which is encoded by modulation is received by the receiver device via at least one track circuit. At least one carrier frequency of the at least one received signal is determined. The transmission method used by the respective train control system is identified taking into account the determined carrier frequency, and the receiver device is set specifically for the identified transmission method. A vehicle-side receiver device of a train control system is provided for performing the method.

15 Claims, 1 Drawing Sheet

(56) References Cited

FOREIGN PATENT DOCUMENTS

| CN | 101722968 | A | 6/2010 |
|---|---|---|---|
| DE | 3435522 | A1 | 4/1986 |
| EP | 1493610 | A2 | 1/2005 |
| EP | 2039583 | B1 | 8/2011 |
| GB | 2441227 | A | 2/2008 |
| JP | 57142106 | S | 9/1982 |
| JP | 3065313 | B1 | 7/2000 |
| JP | 2008105485 | A | 5/2008 |

\* cited by examiner

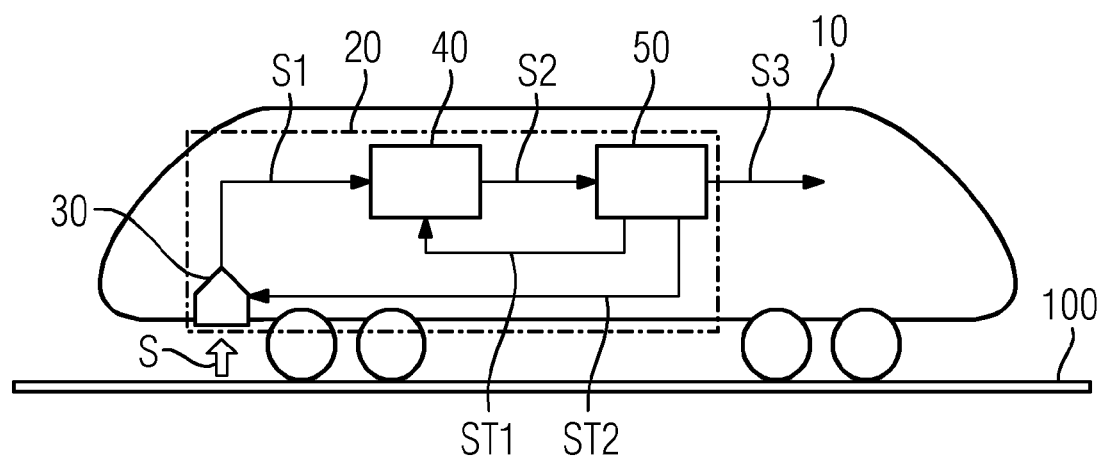

METHOD FOR OPERATING A VEHICLE-SIDE RECEIVER DEVICE OF A TRAIN CONTROL SYSTEM AND VEHICLE-SIDE RECEIVER DEVICE

BACKGROUND OF THE INVENTION

Field of the Invention

Train control systems serve to control and monitor railbound vehicles, which apart from rail vehicles may, for example, also include railbound vehicles with rubber tires. In the course of operation of railbound vehicles, signals or information are customarily transmitted from track-side equipment to a vehicle-side receiver device and hereupon taken into account vehicle-side for the control of the vehicle concerned. The signals may be transmitted to a rail vehicle, for example, in such a way that signals encoded by means of modulation are inductively transmitted to a receiver device of the vehicle using track circuits. Thus, with a type of train control system known as "Pulse Code Cab Signaling" a signal which is encoded by means of modulation, i.e. a periodically blanked carrier frequency, is received by a vehicle-side receiver device of the respective vehicle in the form of so-called pulse codes. Insofar as different blanking frequencies, i.e. different codes, correspond to different speed specifications in this connection, corresponding systems are also described as speed code systems.

For train control systems of the aforementioned kind, in practice a variety of different transmission methods characterized in particular by different carrier frequencies and/or different types of modulation is customary. The respective transmission methods may be manufacturer-specific, operator-specific or specific to the respective transport system as well. Hence, there is regularly a need to adjust vehicle-side receiver devices of the respective train control system, which are also described as vehicle devices, specifically to use on the respective routes or specifically to the respective train control system. This includes, in particular, the provision of special receiving antennas and/or of receiver modules specially tuned to the respective modulation method.

BRIEF SUMMARY OF THE INVENTION

The object of the present invention is to specify a method, which can be used in a particularly efficient and versatile way, for operating a vehicle-side receiver device of a train control system.

This object is achieved according to the invention by a method for operating a vehicle-side receiver device of a train control system, wherein at least one signal which is encoded by means of modulation is received by the receiver device via at least one track circuit, at least one carrier frequency of the at least one received signal is determined, the transmission method used by the respective train control system is identified taking into account the determined at least one carrier frequency, and the receiver device is set specifically for the identified transmission method.

The method according to the invention has the fundamental advantage that the vehicle-side receiver device of the train control system automatically sets itself in relation to the respective transmission method concerned. For this purpose, firstly at least one signal which is encoded by means of modulation is received by the receiver device via at least one track circuit and at least one carrier frequency of the at least one received signal is determined. This can, for example, take place in such a way that a receiving antenna of the vehicle-side receiver device first passes through a predetermined or predeterminable frequency range and thus determines the at least one carrier frequency within the framework of a scan procedure.

Taking into account the determined at least one carrier frequency, as a result it is possible to identify the transmission method used by the respective train control system and to set the receiver device specifically for this transmission method. This means that the vehicle-side receiver device itself undertakes automatic setting, i.e. a "self-configuration", with regard to the respective train control system or with regard to the transmission method used thereby. The respective transmission method is at least characterized by the carrier frequency used or the carrier frequencies used and the kind of modulation used or the kinds of modulations used. Furthermore, it is also possible that the respective transmission method is characterized by additional parameters specific to the train control system concerned, which in this case are likewise taken into account within the framework of the specific setting of the receiver device for the identified transmission method.

The method according to the invention is advantageous as it enables an automatic adjustment of vehicle-side receiver devices of a train control system to the respective transmission method, without necessitating adjustments to the hardware technology or software technology of the receiver device for this. This advantageously results in it being possible to dispense with specific developments and project planning for individual projects or train control systems, resulting in practice in considerable advantages with regard to work and expense.

In accordance with a particularly preferred development of the method according to the invention, the setting of the receiver device comprises the tuning of a receiving antenna to the at least one carrier frequency determined. This is advantageous as consequently no specific receiving antenna is required for the at least one respective carrier frequency of the train control system.

Preferably the method according to the invention can also be designed in such a way that the type of modulation of the at least one encoded signal is determined and the transmission method used by the respective train control system is identified taking further into account the type of modulation determined of the at least one encoded signal. This has the advantage that in addition to the at least one carrier frequency determined, the type of modulation of the at least one encoded signal can also be taken into account when identifying the transmission method used by the respective train control system. This ensures that with regard to such train control systems which use identical carrier frequencies but differ with regard to the type of modulation of the transmitted signals, complete and accurate identification of the respective transmission method and thus specific and accurate setting of the receiver device for the respective transmission method is also enabled.

Preferably the method according to the invention is embodied in such a way that the type of modulation of the at least one signal and/or the transmission method used by the respective train control system is determined taking into account reference carrier frequencies and/or reference types of modulations. The use of reference carrier frequencies and/or reference types of modulation which, for example, can be provided in the form of a reference list of carrier frequencies or of a reference list of types of modulation, for the determination of the type of modulation of the transmission method used by the respective train control system has the advantage that a clear and indisputable determination of the type of modulation of the signal or of the transmission method used is enabled hereby. In this connection, reference-carrier frequencies and/or reference types of modulations can be saved in a database, for example in the form of a corresponding library, and used to identify the known transmission method, i.e. in particular to determine customary carrier frequencies and customary modulation methods used for encoding.

Within the framework of the method according to the invention, by means of the at least one signal in principle any information can be transmitted to the receiver device via the at least one track circuit, i.e. any train control information or data and corresponding operation commands may be involved in this connection.

According to another particularly preferred embodiment of the method according to the invention, information on a maximum permissible speed is received by the receiver device by means of the at least one signal. This is advantageous as corresponding train control systems, for instance in the form of so-called "speed code" systems, are comparatively widespread and are characterized by a multiplicity of different forms with regard to the transmission methods used. The method according to the invention is therefore advantageous for such systems in particular, as manufacturer- or project-specific adjustments or new developments or modifications of the vehicle-side receiver device are avoided by this means. In addition to the information regarding the maximum permissible speed, additional data or information can be received by the receiver device by means of the at least one signal.

Preferably the method according to the invention can also be designed such that the at least one signal has a modulation in the form of a pulse code modulation. In this connection a pulse code modulation describes a type of modulation customary in the area of "Pulse Code Cab Signaling", in which the transmission of information takes place by means of periodic blanking, i.e. activation and deactivation, of the carrier frequency. This therefore corresponds to an amplitude modulation with a change in amplitude of 100%. The application of the method according to the invention to signals with a modulation in the form of a pulse code modulation has the advantage that in this connection determination of the carrier frequency and the type of modulation is possible by the vehicle-side receiver device in a comparatively simple manner.

Preferably the method according to the invention can also be designed in such a way that the method is performed when the receiver device is commissioned for the first time, each time the receiver device is activated and/or continuously during the operation of the receiver device. The method therefore has the advantage that depending on the respective requirements and the respective operating situation, it can be flexibly employed. Thus, for example, it is possible for the method to be automatically executed when the receiver device is commissioned for the first time on a route equipped with a corresponding train control system and the receiver device afterwards permanently set specifically for the identified transmission method. In particular, this may comprise permanent storage or selection of configuration parameters. Furthermore, it is also possible that the method is executed each time the receiver device is activated and the configuration identified in this way is retained until the receiver device is deactivated. Apart from continuous execution of the method during the operation of the receiver device, i.e. at regularly recurring intervals for example, depending on the respective requirements and circumstances, it is also possible for mixed forms of the aforementioned modes of operation to be realized or selected.

With regard to the vehicle-side receiver device of a train control system, the object of the present invention is to specify a particularly powerful vehicle-side receiver device, which can be used in a versatile way.

This object is achieved according to the invention by a vehicle-side receiver device of a train control system, wherein the receiver device is designed to receive at least one signal which is encoded by means of modulation via at least one track circuit, to determine at least one carrier frequency of the at least one received signal, taking into account the at least one carrier frequency determined to identify the transmission method used by the respective train control system and to set itself specifically for the transmission method identified.

The advantages of the vehicle-side receiver device according to the invention correspond to those of the method according to the invention so that in this regard reference is made to the corresponding aforementioned explanations. The same applies with regard to the preferred developments specified hereinafter of the receiver device according to the invention with regard to the corresponding preferred developments of the method according to the invention so that in this regard as well reference is made to the corresponding aforementioned explanations.

Preferably the receiver device according to the invention can be designed to tune a receiving antenna to the at least one carrier frequency determined.

In accordance with another particularly preferred embodiment of the receiver device according to the invention, the receiver device is designed to determine the type of modulation of the at least one encoded signal and to identify the transmission method used by the respective train control system taking further into account the determined type of modulation of the at least one encoded signal.

Preferably the receiver device according to the invention is designed in such a way that the receiver device is designed to determine the type of modulation of the at least one signal and/or the transmission method used by the respective train control system taking into account reference carrier frequencies and/or reference types of modulations.

Preferably the receiver device according to the invention can also be designed to receive information on a maximum permissible speed by means of the at least one signal.

In accordance with another particularly preferred development of the receiver device according to the invention, it is designed to receive encoded signals via the at least one track circuit by means of a modulation in the form of a pulse code modulation.

In accordance with another particularly preferred embodiment, when commissioned for the first time, each time it is activated and/or continuously during its operation the receiver device is designed to identify the transmission method used by the respective train control system and to set itself specifically for the respective transmission method identified.

The invention furthermore comprises a train control system with a receiver device according to the invention or with a vehicle-side receiver device in accordance with an aforementioned preferred development of the vehicle-side receiver device according to the invention and with the at least one track circuit for the transmission of at least one signal which is encoded by means of modulation to the vehicle-side receiver device.

BRIEF DESCRIPTION OF THE SEVERAL VIEWS OF THE DRAWING

The invention is explained in more detail hereinafter with reference to exemplary embodiments.

The FIGURE shows in a diagrammatic view a rail vehicle with an exemplary embodiment of the vehicle-side receiver device according to the invention.

DESCRIPTION OF THE INVENTION

In the FIGURE a rail vehicle 10 is identifiable which is moving along rails or a track 100. The rail vehicle 10 has a vehicle-side receiver device 20 which comprises a receiving antenna 30, a filter 40 and a demodulator 50.

To control and monitor the speed of the rail vehicle 10 and to transmit information to it, within the framework of the aforementioned exemplary embodiment a train control system is used in which by means of track circuits by means of a modulation in the form of a pulse code modulation encoded signals S are transmitted to the receiver device 20 or more precisely to the receiving antenna 30 of the vehicle-side receiver device 20. This inductive transmission from the rails 100 to the receiving antenna 30 is indicated in the FIGURE by means of a double-headed arrow and characterized by the reference character S.

To be able to dispense with an adjustment of the vehicle-side receiver device 20 to the respective train control system specific to the type of respective transmitted signal S, i.e. in particular project- or manufacturer-specific, the vehicle-side receiver device 20 is advantageously designed in such a way that initially at least one carrier frequency of the received signal S is determined by the vehicle-side receiver device 20. This may, for example, take place in such a way that the receiving antenna 30 is controlled by the demodulator 50 or a control device belonging to the same by means of a control signal ST2 so that a predetermined frequency range is passed through or "scanned" by the receiving antenna 20. The respective signal determined in this connection by the receiving antenna 30 is transmitted by the receiving antenna 30 to the filter 40, which is indicated by the reference character S1 in the FIGURE.

By means of the filter 40 which may, for example, be designed as a simple analog filter or also as a digital filter, a frequency selection of the signal S1 is undertaken. In accordance with the exemplary embodiment of the FIGURE, the filter 40 can also be tuned by the demodulator 50 by means of a control signal ST1 with regard to different frequencies or frequency ranges of the signal S1.

As a result, a frequency-selected, pulse-code modulated signal S2 is therefore transmitted by the tunable filter 40 to the demodulator 50. Based on the signal S2, it is possible for the demodulator 50 to determine the carrier frequency of the signal S1, for example, on the basis of an evaluation of the maximum received field strength, on the basis of the scan procedure performed. Insofar as the train control system concerned uses a number of carrier frequencies, i.e. for example, adjacent track circuits operate at different carrier frequencies, in particular if this is necessary for the clear identification of the transmission method used, these carrier frequencies may also be determined in the aforementioned manner.

The demodulator 50 comprises a digital processing device and a library stored in a database containing a list of reference carrier frequencies and reference types of modulations which are known or customary. Using the reference list of carrier frequencies, the demodulator 50 determines the respective carrier frequency or the respective carrier frequencies and taking further into account a reference list of types of modulation identifies the type of modulation of the at least one encoded signal and as a result the transmission method used by the respective train control system. Depending on the respective circumstances, in this connection it may be sufficient for only a proportion of the carrier frequencies and/or modulations or "pulse codes" used by the train control system concerned to actually be determined, insofar as the information obtained is sufficient for a clear identification of the transmission method or the train control system. An identification of the transmission method in particular includes the entirety of the carrier frequencies used and the types of modulations used being known to the receiver device as a result. This means that a knowledge of the transmission method makes it possible to set the vehicle-side receiver device 20 specifically for the respective train control system. This specific setting of the vehicle-side receiver device 20 for the identified transmission method in this connection can in turn take place in such a way that the demodulator 50 undertakes a corresponding tuning, now invariable until further notice, of the filter 40 or of the receiving antenna 30 by means of control signals ST1 or ST2.

Within the framework of the operation of the receiver device 20, a demodulated signal aspect is provided by the demodulator 50 on the output side, which is indicated in the FIGURE by the reference character S3. This demodulated signal aspect S3 is subsequently made available to a vehicle-side control computer of the train control system, which is not shown in the FIGURE for reasons of clarity.

Controlling or influencing of the rail vehicle 10 is now undertaken by the control computer of the train control system on the basis of the demodulated signal aspect S3, i.e. in the final analysis on the basis of the signal S received via the at least one track circuit. This can take place, in particular, by ensuring that information received with the signal S with regard to a maximum permissible speed is taken into account or that the observance of this maximum speed is monitored.

Insofar as signals encoded with different modulations are required for a clear identification of the transmission method, for a recording of these signals it is not essential that for the purpose of the reception of different signals, the respective vehicle is moved along a route i.e. for example, the rails 100. Instead of this it is also conceivable, for example, that a vehicle which is positioned in front of a signaling device displaying a red light receives the associated signal via the track circuit and after the signaling device has switched to a green light, receives an additional signal associated with this signal state, i.e. a signal encoded with another modulation. Taking into account both the received signals, a clear identification of the transmission method employed may now be possible.

In accordance with the aforementioned explanations, the sequence of the aforementioned method is therefore essentially that the carrier frequency or the carrier frequencies is/are initially determined automatically by way of a scanning procedure by means of corresponding tuning of the receiving antenna 30 and of the filter 40 and then the respective type of modulation, i.e. the respective modulation method, is automatically detected by a selection being made from a library containing known manufacturer-specific carrier frequencies and modulation methods. Thus, a self-configuration of the vehicle-side receiver device 20 occurs with regard to the respective transmission method concerned, as a result of which corresponding work involving a project-specific adjustment of the vehicle-side receiver device 20 or its components is advantageously avoided.

It should be pointed out that the receiver device 20 could of course also be realized by other components; furthermore, another distribution of functions between the components would also be conceivable, for example, with the scan procedure being performed entirely or at least largely independently by the receiving antenna 30 and the filter 40.

Depending on the respective circumstances, the aforementioned method can be executed when the vehicle-side receiver device 20 is commissioned for the first time, each time the receiver device 20 is activated and/or continuously during the operation of the receiver device 20.

The aforementioned method and the corresponding vehicle-side receiver device can also be advantageously employed in a migration phase in particular, i.e. when replacing an existing train control system with a new train control system and the associated use of a new transmission method. Thus, in this case the automatic setting of the receiver device with regard to the transmission method used at the respective time is possible. In particular, this obviates the need for a number of receiver devices on the vehicle-side, i.e. one each for the old and the new train control system, resulting in savings in terms of the requirement for space, the costs and the work required for project planning and development of corresponding vehicle-side receiver devices.

The invention claimed is:

1. A method for operating a vehicle-side receiver device of a train control system, which comprises the steps of:
   receiving at least one encoded signal, being encoded by modulation, by the vehicle-side receiver device via at least one track circuit;
   determining at least one carrier frequency of the at least one encoded signal received;
   identifying a transmission method used by a respective train control system taking into account the at least one carrier frequency determined; and
   setting the vehicle-side receiver device specifically for the transmission method identified.

2. The method according to claim 1, which further comprises during the setting of the vehicle-side receiver device, tuning a receiving antenna to the at least one carrier frequency determined.

3. The method according to claim 1, which further comprises:
   determining a type of modulation of the at least one encoded signal; and
   identifying the transmission method used by the respective train control system taking further into account the type of modulation of the at least one encoded signal.

4. The method according to claim 3, which further comprises determining the type of the modulation of the at least one encoded signal and/or the transmission method used by the respective train control system taking into account reference carrier frequencies and/or reference types of modulations.

5. The method according to claim 1, wherein information on a maximum permissible speed is received by the vehicle-side receiver device by means of the at least one encoded signal.

6. The method according to claim 1, wherein the at least one encoded signal has a modulation in a form of a pulse code modulation.

7. The method according to claim 1, which further comprises executing the method when the vehicle-side receiver device is commissioned for a first time, each time the vehicle-side receiver device is activated and/or continuously during an operation of the vehicle-side receiver device.

8. A vehicle-side receiver device system for a train control system, comprising:
   a receiver device configured to:
      receive at least one encoded signal being encoded by modulation via at least one track circuit;
      determine at least one carrier frequency of the at least one encoded signal received;
      identify a transmission method used by a respective train control system taking into account the at least one carrier frequency determined; and
      set said receiver device specifically for the transmission method identified.

9. The receiver device system according to claim 8, wherein said receiver device has a receiving antenna, said receiver device tuning said receiving antenna to the at least one carrier frequency determined.

10. The receiver device system according to claim 8, wherein said receiver device determines a type of modulation of the at least one encoded signal, and identifies the transmission method used by the respective train control system taking further into account a determined type of the modulation of the at least one encoded signal.

11. The receiver device system according to claim 10, wherein said receiver device determines the type of the modulation of the at least one encoded signal and/or the transmission method used by the respective train control system taking into account reference carrier frequencies and/or reference types of modulations.

12. The receiver device system according to claim 8, wherein said receiver device receives information on a maximum permissible speed by means of the at least one encoded signal.

13. The receiver device system according to claim 8, wherein said receiver device receives signals which are encoded by means of modulation in a form of a pulse code modulation via the at least one track circuit.

14. The receiver device system according to claim 8, wherein said receiver device identifies the transmission method used by the respective train control system when said receiver device is commissioned for a first time, each time said receiver device is activated and/or continuously during an operation of said receiver device and to set said receiver device specifically for the respective identified transmission method.

15. A train control system, comprising:
   at least one track circuit for transmitting at least one encoded signal encoded by modulation;
   a vehicle-side receiver device configured to:
      receive the at least one encoded signal being encoded by modulation via said at least one track circuit;
      determine at least one carrier frequency of the at least one encoded signal received;
      identify a transmission method used by a respective train control system taking into account the at least one carrier frequency determined; and
      set said receiver device specifically for the transmission method identified.

* * * * *